US010703866B2

(12) United States Patent
Pirri et al.

(10) Patent No.: US 10,703,866 B2
(45) Date of Patent: *Jul. 7, 2020

(54) MULTISTAGE POLYMER POWDER COMPOSITION, ITS METHOD OF PREPARATION AND USE

(71) Applicant: Arkema France, Colombes (FR)

(72) Inventors: Rosangela Pirri, Montardon (FR); Christiaan A. Schipper, Chesterbrook, PA (US); Philippe Hajji, Chatillon d'Azergues (FR)

(73) Assignee: Arkema France, Colombes (FR)

( * ) Notice: Subject to any disclaimer, the term of this patent is extended or adjusted under 35 U.S.C. 154(b) by 168 days.

This patent is subject to a terminal disclaimer.

(21) Appl. No.: 15/301,805

(22) PCT Filed: Apr. 7, 2015

(86) PCT No.: PCT/EP2015/057517
§ 371 (c)(1),
(2) Date: Oct. 4, 2016

(87) PCT Pub. No.: WO2015/155185
PCT Pub. Date: Oct. 15, 2015

(65) Prior Publication Data
US 2017/0183457 A1    Jun. 29, 2017

(30) Foreign Application Priority Data

Apr. 7, 2014 (FR) .................................... 14 53045

(51) Int. Cl.
| C08L 27/00 | (2006.01) |
| C08J 3/12 | (2006.01) |
| C08L 51/00 | (2006.01) |
| C08L 27/06 | (2006.01) |
| C08F 265/06 | (2006.01) |
| C08L 101/04 | (2006.01) |

(52) U.S. Cl.
CPC ............. *C08J 3/126* (2013.01); *C08F 265/06* (2013.01); *C08L 27/06* (2013.01); *C08L 51/003* (2013.01); *C08L 101/04* (2013.01); *C08J 2333/12* (2013.01); *C08J 2433/08* (2013.01); *C08L 2207/53* (2013.01)

(58) Field of Classification Search
CPC ......... C08J 3/126; C08F 265/06; C08L 27/06; C08L 51/003; C08L 101/04
USPC ......................................................... 523/201
See application file for complete search history.

(56) References Cited

U.S. PATENT DOCUMENTS

| 3,925,510 | A | 12/1975 | Ide et al. |
| 3,983,296 | A | 9/1976 | Purvis et al. |
| 4,391,928 | A | 7/1983 | Herman et al. |
| 4,497,917 | A | 2/1985 | Upson et al. |
| 4,892,910 | A | 1/1990 | Klesse et al. |
| 4,916,171 | A | 4/1990 | Brown et al. |
| 5,306,743 | A | 4/1994 | Klesse et al. |
| 6,043,293 | A | 3/2000 | Belik et al. |
| 8,859,678 | B2 | 10/2014 | Disson et al. |
| 10,316,127 | B2 * | 6/2019 | Navarro ................ C08F 279/02 |
| 10,435,518 | B2 * | 10/2019 | Pirri ........................ C08F 2/001 |
| 2002/0013405 | A1 | 1/2002 | Sakaguchi et al. |
| 2002/0072552 | A1 | 6/2002 | Wills et al. |
| 2004/0039123 | A1 | 2/2004 | Troy et al. |
| 2005/0049332 | A1 | 3/2005 | Higuchi et al. |
| 2005/0250880 | A1 | 11/2005 | Troy et al. |
| 2008/0199675 | A1 * | 8/2008 | Koyama ................. B32B 25/00 428/220 |
| 2012/0142796 | A1 | 6/2012 | Sato et al. |
| 2013/0052457 | A1 | 2/2013 | Inui et al. |
| 2017/0174847 | A1 * | 6/2017 | Pirri ........................ C08F 2/001 |
| 2017/0355801 | A1 * | 12/2017 | Couffin ..................... C08F 6/22 |
| 2017/0369696 | A1 * | 12/2017 | Inoubli ................. C08F 265/06 |

FOREIGN PATENT DOCUMENTS

| EP | 0 256 391 | 2/1988 |
| JP | 10-017626 | 1/1998 |
| JP | 2002-212303 | 7/2002 |

* cited by examiner

*Primary Examiner* — Hannah J Pak
(74) *Attorney, Agent, or Firm* — Lynn B. Morreale

(57) ABSTRACT

The present invention relates to halogenated containing polymer composition with a modifier that is a polymeric processing aid in form a non dusty polymer powder made by a multistage process while the last stage uses ethyl acrylate as major monomer.

6 Claims, No Drawings

MULTISTAGE POLYMER POWDER COMPOSITION, ITS METHOD OF PREPARATION AND USE

CROSS-REFERENCE TO RELATED APPLICATIONS

This application is a national stage application under 35 U.S.C. § 371 of PCT/EP2015/057517, filed Apr. 7, 2015 which claims benefit to application FR14.53045, filed Apr. 7, 2014.

FIELD OF THE INVENTION

The present invention relates to a polymeric processing aid in form a non dusty polymer powder, its composition and its process of preparation.

In particular the present invention it relates to a polymeric processing aid in form a non dusty polymer powder made by a multistage process while the last stage consist of using ethyl acrylate as major monomer.

More particularly the present invention relates to halogenated containing polymer composition with a modifier that is a polymeric processing aid in form a non dusty polymer powder made by a multistage process while the last stage consist of using ethyl acrylate as major monomer.

Technical Problem

Polymer powders comprising polymers with specific characteristic (such as polymer composition, glass transition temperature or specific molecular weight range for naming some characteristics) are widely used products, such as additives for various polymers in order to enhance the processing behavior of these various polymers or plastic resin or to improve their performance.

Usually these polymer powders are composed of grains of aggregated latex particles. The aggregation can be obtained by coagulation under stirring while mixing the polymer latex with an aqueous electrolyte solution or by spray drying the polymer latex.

However the manipulation and handling of these powders are disadvantageous due to the large fine particle content in view of security and health aspect.

The handling of powders is also difficult in view of bad flow ability of the powders.

The powders are used as so called processing aids in order to improve the processing of resins such as halogenated polymers, and foamable halogenated polymers and formulations, notably halogenated polymers as polyvinylchloride (PVC).

The processing aids are useful for increasing the thermoplastic resin melt strength for the thermoplastic transformation as blow molding, injection molding, foaming and thermoforming.

The objective of the present invention is to propose a polymer powder composition which is non dusty.

An objective of the present invention is also to have a polymer powder composition with a low fine content.

Another objective of the present invention is to avoid a too fine powder and to obtain a polymer powder with coarser particles.

An additional objective of the present invention is the adaption of the polymer powder composition of the polymer powder according to the monomer composition of the respective polymers, especially the monomer composition of the polymers of respective stages of a polymer powder obtained by a multistage process.

Still another objective of the present invention is a method for manufacturing a polymer powder composition which is non dusty and is having a low fine content.

Still an additional objective is having a process for preparing polymer powder composition of a multistage polymer which is non dusty, with a low fine content, and estimating the polymer composition and ratio of the respective stages according to the composition and the corresponding Tg of the polymer of the last stage.

Still a further objective is to obtain a halogenated polymer composition that is easily processable with the multistage polymer.

BACKGROUND OF THE INVENTION

Prior Art

The document U.S. Pat. No. 3,983,296 discloses modifiers for PVC foams. The modifier system comprises two core-shell polymers. The shell of the core shell polymers should be substantially ungrafted. The first core shell polymer has an acrylic polymeric shell with a molecular weight above 1.5 million. The acrylic shell comprises according to the examples ethyl acrylate. The second core shell polymer has a core with a molecular weight under 100 000 and a shell with a molecular weight of at least 450 000.

The document EP 0911 358 discloses PVC foamable compositions comprising a polymer obtained by emulsion polymerization that is a simple high molecular weight latex based on methyl methacrylate and a C2-C18 alkyl methacrylate or a core-shell structure of the same composition.

The document U.S. Pat. No. 4,892,910 discloses polymer powders of low fines content and a method for making the same by spray drying. Said powder is obtained aggregating polymer particles of an aqueous dispersion comprising at least two different emulsion polymers (A) and (B) particles. This has the disadvantage, that two different polymers have to be prepared separately, that have to be mixed in a certain ratio and that the two different polymer particles should be compatible which each other.

The document WO 2008/104701 describes processing aids which are (meth)acrylic copolymers. The copolymers are made by emulsion polymerization and are recovered as a dry powder by spray drying. The (meth) acrylic polymers are simple polymers not obtained by a multi step process.

The document US 2004/0039123 discloses polymeric compositions having low glass transition temperatures which are useful as plastic additives. The polymeric composition comprises a first polymeric stage that is preferably made of ethyl acrylate. The second polymeric stage is made from polymers that have a glass transition temperature of at least 20° C. The polymeric weight of the first stage is at least $4 \times 10^6$ g/mol and that of the second polymeric stage greater then $1 \times 10^5$ g/mol.

The document US2012/0142796 discloses processability improver for foam molding and vinyl chloride resin composition containing the same. The processability improver is obtained by a multistage process for polymeric particles comprising two (meth)acrylic polymers of a different molecular weight. The process discloses a process with a first stage, the preparation of a (meth)acrylic polymer with a weight average molecular weight between 10 000 and 300 000 and the as a second stage, the preparation of a (meth) acrylic polymer with a weight average molecular weight between 2 000 000 and 7 000 000 in presence of the first stage.

The document US2005/0049332 discloses a process for producing powdery linear polymer having improved powder properties. The process is a two step coagulation process of a latex of a multilayer polymer. The multilayer polymer comprises a linear polymer with a glass transition temperature below 40° C. and another linear polymer with a higher glass transition temperature (hard polymer). For that coagulation process it is important that the hard polymer is the outermost layer or that at most 30 wt % of the polymer with glass transition temperature is present in the outermost layer, the remaining portion is an inner layer of the multilayer polymer.

The document US2005/0250880 discloses a polymeric composition having low glass transition temperature. The polymeric composition comprises a first polymeric stage having a glass transition of at most 20° C. and a second polymeric stage having a glass transition of at least 30° C. The polymeric compositions are isolated as powders, more specifically they are co-isolated them by adding other polymeric particles and then co-coagulate or co-spray dry the whole together.

Non of the prior art documents discloses a multistage polymer comprising a stage comprising a polymer with at least 50 wt % ethyl acrylate units and a molecular weight less then 1 000 000 g/mol.

BRIEF DESCRIPTION OF THE INVENTION

Surprisingly it has been found that a polymer composition in form of polymeric particles comprising
  at least one stage forming a layer (B) comprising a polymer (B1) having a glass transition temperature of at least 60° C. and
  at least one stage forming a layer (A) comprising a polymer (A1) having a glass transition temperature of less then 60° C. and polymer (A1) comprises at least 50 wt % of polymeric units coming from ethyl acrylate,
obtained by a multistage process characterized that the weight ratio r of the layer (A) in the composition comprising the two layers is at least 2 wt %, gives a non-dusty polymer powder with a low fine content and can be used as processing aid for halogenated polymers.

Surprisingly it has also been found that a polymer composition in form of polymeric particles comprising
  at least one stage forming an inner layer (B) comprising a polymer (B1) having a glass transition temperature of at least 60° C. and
  at least one stage forming an outer layer (A) comprising a polymer (A1) having a glass transition temperature of less then 60° C. and polymer (A1) comprises at least 50 wt % of polymeric units coming from ethyl acrylate,
obtained by a multistage process characterized that the weight ratio r of the outer layer (A) in the composition comprising the two layers is at least 2 wt %, yields to a non-dusty polymer powder with a low fine content after agglomeration of the polymer particles for forming the polymer powder and can be used as processing aid for halogenated polymers.

Surprisingly it has also been found that a method for manufacturing a polymer composition comprising the steps of
  a) polymerizing by emulsion polymerization of a monomer or monomer mixture ($B_m$) to obtain layer (B) comprising a polymer (B1) having a glass transition temperature of at least 60° C.
  b) polymerizing by emulsion polymerization of a monomer or monomer mixture ($A_m$) to obtain one layer (A) comprising polymer (A1) having a glass transition temperature of less then 60° C. in presence of the polymer obtained in step a)
wherein the weight ratio r of the layer (A) in the composition comprising the two layers is at least 2 wt % and the monomer mixture (Am) comprises at least 50 wt % of ethyl acrylate, yields to a non-dusty polymer powder with a low fine content after agglomeration of the polymer particles for forming the polymer powder and can be used as processing aid for halogenated polymers.

Surprisingly it has also been found that a polymer composition comprising
  a) a halogenated polymer and
  b) a polymer obtained by a multistage process with
    at least one stage forming an inner layer (B) comprising a polymer (B1) having a glass transition temperature of at least 60° C. and
    at least one stage forming an outer layer (A) comprising a polymer (A1) having a glass transition temperature of less then 60° C. and polymer (A1) comprises at least 50 wt % of polymeric units coming from ethyl acrylate,
characterized that the weight ratio r of the outer layer (A) in the polymer obtained by a multistage process comprising the two layers is at least 2 wt %, can be processed easily.

DETAILED DESCRIPTION OF THE INVENTION

According to a first aspect, the present invention relates to a polymer composition in form of polymeric particles comprising
  at least one stage forming a layer (B) comprising a polymer (B1) having a glass transition temperature of at least 60° C. and
  at least one stage forming a layer (A) comprising a polymer (A1) having a glass transition temperature of less then 60° C. and polymer (A1) comprises at least 50 wt % of polymeric units coming from ethyl acrylate,
obtained by a multistage process characterized that the weight ratio r of the layer (A) in the composition comprising the two layers is at least 2 wt %.

According to a second aspect, the present invention relates to a polymer composition in form of polymeric particles comprising
- at least one stage forming an inner layer (B) comprising a polymer (B1) having a glass transition temperature of at least 60° C. and
- at least one stage forming an outer layer (A) comprising a polymer (A1) having a glass transition temperature of less then 60° C. and polymer (A1) comprises at least 50 wt % of polymeric units coming from ethyl acrylate, obtained by a multistage process characterized that the weight ratio r of the outer layer (A) in the composition comprising the two layers is at least 2 wt %.

In a third aspect the present invention relates to a method for manufacturing a polymer composition comprising the steps of
a) polymerizing by emulsion polymerization of a monomer or monomer mixture ($B_m$) to obtain layer (B) comprising a polymer (B1) having a glass transition temperature of at least 60° C.
b) polymerizing by emulsion polymerization of a monomer or monomer mixture ($A_m$) to obtain one layer (A) comprising polymer (A1) having a glass transition temperature of less then 60° C. in presence of the polymer obtained in step a)

wherein the weight ratio r of the layer (A) in the composition comprising the two layers is at least 2 wt % and the monomer mixture (Am) comprises at least 50 wt % of ethyl acrylate.

In a fourth aspect the present invention relates to a polymer composition comprising
a) a halogenated polymer and
b) a polymer obtained by a multistage process with
- at least one stage forming an inner layer (B) comprising a polymer (B1) having a glass transition temperature of at least 60° C. and
- at least one stage forming an outer layer (A) comprising a polymer (A1) having a glass transition temperature of less then 60° C. and polymer (A1) comprises at least 50 wt % of polymeric units coming from ethyl acrylate, characterized that the weight ratio r of the outer layer (A) in the polymer obtained by a multistage process comprising the two layers is at least 2 wt %.

By the term "polymer powder" as used is denoted a polymer comprising powder grain in the range of at least 1 micrometer (μm) obtained by agglomeration of primary polymer comprising particles in the nanometer range.

By the term "primary particle" as used is denoted a spherical polymer comprising particle in the nanometer range. Preferably the primary particle has a weight average particle size between 50 nm and 500 nm.

By the term "non-dusty" as used is understood that the polymer powder has a low fine content.

By the term "low fine content" as used is denoted that the polymer powder has a D10 value of the particle size that is above 10 μm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "PVC" as used is understood polyvinyl chloride in form of homopolymer or copolymer comprising at least 50 wt % of vinyl chloride.

With regard to the spherical polymer particle, which is the primary particle that makes up by agglomeration the polymer powder of the invention, it has a weight average particle size between 20 nm and 500 nm. Preferably the weight average particle size of the polymer is between 50 nm and 400 nm, more preferably between 75 nm and 350 nm and advantageously between 80 nm and 300 nm.

The polymer particle has a multilayer structure comprising at least one layer (A) comprising a polymer (A1) having a glass transition temperature below 60° C. comprising at least 50 wt % of polymeric units coming from ethyl acrylate and another layer (B) comprising a polymer (B1) having a glass transition temperature over 60° C. Preferably the polymer (A1) having a glass transition temperature below 60° C. comprising at least 50 wt % of polymeric units coming from ethyl acrylate in the layer (A) is the external layer of the polymer particle having the multilayer structure.

The polymer particle is obtained by a multistage process such as two or three stages. Preferably the polymer (A1) having a glass transition temperature below 60° C. comprising at least 50 wt % of polymeric units coming from ethyl acrylate in the layer (A) is made in the last stage of the multistage process external for the polymer particle having the multilayer structure.

There could be additional intermediate layers.

The weight ratio r of the external layer (A) comprising polymer (A1) latter comprising at least 50 wt % of polymeric units coming from ethyl acrylate in the complete polymer particle is at least 2 wt %.

According to the invention the ratio r of the external layer (A) comprising polymer (A1) in the complete polymer particle has to adapted based on the exact composition of the polymer (A1) comprising at least 50 wt % of polymeric units coming from ethyl acrylate and especially on function of its glass transition temperature in view of the comonomer or comonomers used with ethyl acrylate.

Preferably the polymer (A1) comprising at least 50 wt % of polymeric units coming from ethyl acrylate according to the invention has a glass transition temperature between 200K and 333K.

More specifically the weight ratio r in wt % of the external layer (A) comprising polymer (A1) comprising at least 50 wt % of polymeric units coming from ethyl acrylate in the complete polymer particle, for a Tg between 200K and 333K of the polymer (A1) is defined by following formula (1):

$$r = b_1 e^{a_1 T} \quad (1)$$

wherein the variable T is the glass transition temperature Tg expressed in Kelvin of the polymer (A1) of the external layer (A), the exponent $a_1$ and the factor $b_1$ are parameters.

For the minimal weight ratio r in wt % of the external layer (A) comprising polymer (A1) in the complete polymer particle the exponent $a_1$ is at least 0.0255 and the factor $b_1$ is at least 0.0055, preferably the exponent $a_1$ is at least 0.0257 and factor $b_1$ is at least 0.0056 and more preferably the exponent $a_1$ is at least 0.026 and factor $b_1$ is at least 0.0057.

Preferably for the maximal weight ratio r of the external layer (A) comprising polymer (A1) in the complete polymer particle, exponent $a_1$ is at most 0.028 and $b_1$ is at most 0.007, preferably the exponent $a_1$ is at most 0.0275 and factor $b_1$ is at most 0.0065, more preferably the exponent $a_1$ is at most 0.027 and factor $b_1$ is at most 0.0065 and advantageously the exponent $a_1$ is at most 0.0265 and factor $b_1$ is at most 0.0065.

Preferably the weight ratio r of the external layer (A) comprising polymer (A1) in the complete polymer particle is at most 30%, more preferably at most 29% and advantageously at most 28%.

Preferably the polymer (A1) is present only in the external layer (A).

The glass transition temperature Tg can be estimated for example by dynamic methods as thermo mechanical analysis.

In the case of the present invention, in order to calculate the necessary quantity of the polymer (A1) according to equation (1), the monomers for forming the polymer (A1) can be polymerized alone, in order to obtain a sample of polymer (A1) for estimating and measuring its glass transition temperature Tg. If the glass transition temperature Tg of the polymer (A1) is already known the necessary quantity of polymer (A1) based on ratio r can be calculated according to equation (1).

The polymer powder of the invention is in form of particles. A polymer powder particle comprises agglomerated primary polymer particles made by multistage process.

With regard to the polymer powder of the invention, it has a volume median particle size D50 between 1 μm and 500 μm. Preferably the volume median particle size of the polymer powder is between 10 μm and 400 μm more preferably between 15 μm and 350 μm and advantageously between 20 μm and 300 μm.

The D10 of the particle size distribution in volume is at least 7 μm and preferably 10 μm.

The D90 of the particle size distribution in volume is at most 500 μm and preferably 400 μm, more preferably at most 250 μm.

With regard to the polymer (A1), is a (meth) acrylic polymer comprising at least 50 wt % of polymeric units coming from ethyl acrylate.

More preferably the polymer (A1) comprises a comonomer or comonomers which are copolymerizable with ethyl acrylate, as long as polymer (A1) is having a glass transition temperature of less then 60° C.

The comonomer or comonomers in polymer (A1) are preferably chosen from (meth)acrylic and/or vinyl monomers.

The (meth)acrylic comonomer in polymer (A1) comprises monomers chosen from C1 to C12 alkyl (meth)acrylates. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less then 60° C.

In a specific embodiment polymer (A1) is a homopolymer of ethyl acrylate.

More preferably the glass transition temperature Tg of the polymer (A1) comprising at least 50 wt % of polymeric units coming from ethyl acrylate is between −50° C. and 50° C., even more preferably between −40° C. and 30° C. and advantageously between −30° C. and 20° C.

Preferably the mass average molecular weight Mw of the polymer (A1) comprising at least 50 wt % of polymeric units coming from ethyl acrylate is less than 1 000 000 g/mol, more preferably less than 500 000 g/mol and most preferably less than 300 000 g/mol.

With regard to the polymer (B1), mention may be made of homopolymers and copolymers comprising monomers with double bonds and/or vinyl monomers. Preferably the polymer (B1) is also a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the mass average molecular weight of the polymer (B1) is at least 300 000 g/mol, preferably at least 500 000 g/mol, more preferably at least 750 000 g/mol, advantageously at least 1 000 000 g/mol and most advantageously at least 1 500 000 g/mol.

In the case of the present invention, in order to measure the mass average molecular weight Mw of the polymer (B1) alone, the monomers for forming the polymer (B1) can be polymerized alone, in order to obtain a sample of polymer (B1). The same applies for the polymer (A1).

With regard to the method for manufacturing the polymer composition according to the invention is comprises the steps of
   a) polymerizing by emulsion polymerization of a monomer or monomer mixture $(B_m)$ to obtain layer (B) comprising a polymer (B1) having a glass transition temperature of at least 60° C.
   b) polymerizing by emulsion polymerization of a monomer or monomer mixture $(A_m)$ to obtain one layer (A) comprising polymer (A1) having a glass transition temperature of less then 60° C.
the weight ratio r of the layer (A) in the composition comprising the two layers is at least 2 wt % and the monomer mixture (Am) comprises at least 50 wt % of ethyl acrylate.

Preferably the step a) is made before step b). More preferably step b) is performed in presence of the polymer (B) obtained in step a).

Advantageously the method for for manufacturing the polymer composition according to the invention is a multistep process comprises the steps one after the other of
   a) polymerizing by emulsion polymerization of a monomer or monomer mixture $(B_m)$ to obtain layer (B) comprising a polymer (B1) having a glass transition temperature of at least 60° C.

b) polymerizing by emulsion polymerization of a monomer or monomer mixture ($A_m$) to obtain one layer (A) comprising polymer (A1) having a glass transition temperature of less then 60° C. in presence of the polymer obtained in step a)

wherein the weight ratio r of the obtained layer (A) in the composition comprising the two layers is at least 2 wt % and the monomer mixture (Am) comprises at least 50 wt % of ethyl acrylate.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before.

More specifically the weight ratio r in wt % of the external layer (A) comprising polymer (A1) in the complete polymer particle made by the manufacturing method, for a Tg between 200K and 340K and preferably for a Tg between 200K and 333K, of the polymer (A1) is defined by following formula (2):

$$r = b_1 e^{a_1 T} \quad (2)$$

wherein the variable T is the glass transition temperature Tg expressed in Kelvin of the polymer (A1) of the external layer (A) and the exponent a1 and the factor b1 are parameters.

For the minimal weight ratio r in wt % of the external layer (A) comprising polymer (A1) in the complete polymer particle the exponent a1 is at least 0.0255 and the factor b1 is at least 0.0055, preferably the exponent a is at least 0.0257 and factor b is at least 0.0056 and more preferably the exponent a is at least 0.026 and factor b is at least 0.0057.

Preferably for the maximal weight ratio r of the external layer (A) comprising polymer (A1) in the complete polymer particle a1 is at most 0.028 and b1 is at most 0.007, preferably the exponent a is at most 0.0275 and factor b is at most 0.0065, more preferably the exponent a is at most 0.027 and factor b is at most 0.0065 and advantageously the exponent a is at most 0.0265 and factor b is at most 0.0065.

Preferably the weight ratio r of the external layer (A) comprising polymer (A1) in the complete polymer particle is at most 30 wt %, more preferably at most 29 wt % and advantageously at most 28 wt %.

Preferably the polymer (A1) is present only in the external layer (A).

The method for manufacturing the polymer composition according to the invention can optionally comprise the additional step c) for recovering the polymer composition. The recovering is made by coagulation or by spray drying.

Coagulation is made by aggregation of the primary polymer particles at the end of the emulsion polymerization by adding an aqueous electrolyte solution under stirring.

Spray drying is the preferred method for the recovering and/or drying for the manufacturing method for a polymer powder composition according to the present invention.

The present invention relates also to the use of the polymer composition in form of the polymer powder according to the invention as processing aid in thermoplastic polymers. Preferably the thermoplastic polymers are halogen containing polymers.

A process aid is added to the thermoplastic material in order to avoid problems during the processing or to ease the processing of these thermoplastic polymers and when melt processed avoid undesirable defects in the finished shape made of the thermoplastic polymer.

With reagard to the halogen containing polymer composition according to the invention it comprises a) a halogenated polymer and
b) a polymer obtained by a multistage process with
   at least one stage forming an inner layer (B) comprising a polymer (B1) having a glass transition temperature of at least 60° C. and
   at least one stage forming an outer layer (A) comprising a polymer (A1) having a glass transition temperature of less then 60° C. and polymer (A1) comprises at least 50 wt % of polymeric units coming from ethyl acrylate, characterized that the weight ratio r of the outer layer (A) in the polymer obtained by a multistage process comprising the two layers is at least 2 wt %.

The preferred and advantageously variants of the method for manufacturing the polymer composition obtained by the multistage process are the same as defined before.

The respective layers (A) and (B) respectively comprising the polymers (A1) and (B1) respectively and the characteristics of the respective polymers (A1) and (B1) are the same as defined before.

With regard to the halogen containing polymer, mention may be made of:

homopolymers and copolymers of vinyl chloride (PVC) and of vinylidene chloride (PVDC), vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds;

polymers of vinyl chloroacetate and dichlorodivinyl ether; chlorinated polymers of vinyl carboxylate, such as vinyl acetate, vinyl propionate, vinyl butyrate, chlorinated polymeric esters of acrylic acid and of α-substituted acrylic acid, such as methacrylic acid, of nitriles, amides, alkyl esters such as acrylonitrile, (meth)acrylamide, methyl (meth)acrylate, butyl acrylate, ethyl acrylate, 2-ethylhexyl acrylate;

polymers of vinyl aromatic derivatives, such as styrene, dichlorostyrene; chlorinated rubbers;

chlorinated polymers of olefins, such as ethylene, propene, 1-butene, (2.2.1)bicyclo heptene-2, (2.2.1)bicyclo hepta-diene-2,5;

polymers and post-chlorinated polymers of chlorobutadiene and copolymers thereof with vinyl chloride, chlorinated natural and synthetic rubbers, and also mixtures of these polymers with one another or with other polymerizable compounds.

grafted halogen containing copolymers, where the halogen containing polymer part is grafted on an (meth) acrylic homo or copolymer, in form of a particles, which could be crosslinked or not.

Preferably the halogen containing polymer is a thermoplastic polymer and not an elastomeric polymer. The glass transition temperature (measured by differential scanning calorimetry) of the thermoplastic polymer is at least 40° C., preferably 50° C.

Preferably the halogen in the halogen containing polymer is chosen from fluorine or chlorine and advantageously the halogen is chlorine.

The chlorine containing polymer is chosen from among polymers or mixtures of polymers chosen from among homopolymer vinyl chlorides such as polyvinyl chloride, polyvinylidene chloride, chlorinated polyvinyl chloride, post-chlorinated polyvinyl chloride and copolymers formed by the polymerisation of a vinyl chloride monomer with up to 40% of a comonomer such as vinyl acetate, vinyl butyrate, vinylidene chloride, propylene, methyl methacrylate and the like, as well as chlorine-containing polymers containing other polymers such as chlorinated polyethylene, terpolymers of acrylonitrile, butadiene, styrene, terpolymers of methyl methacrylate, butadiene, styrene; polyacrylate resins, poly methyl methacrylate resins and terpolymer of alkyl acrylate, methyl methacrylate, butadiene, preferably the chlorine-containing polymer is polyvinyl chloride or post-chlorinated polyvinyl chloride.

Preferably the chlorine containing polymer is chosen from homo- and copolymers of vinyl chloride (VC); comprising at least 50 wt % of VC units, preferably at least 70 wt % of VC units, more preferably at least 80 wt % of VC units, advantageously at least 85 wt % of VC units; or mixtures thereof.

Preferably the copolymer of vinyl chloride comprises between 1 wt % and 30 wt % of vinyl acetate units, more preferably between 5 wt % and 20 wt % of vinyl acetate units, advantageously between 10 wt % and 15 wt % of vinyl acetate units.

The halogen containing polymer composition according to the invention, it comprises between 1 wt % and 20 wt % of polymer composition obtained by the multistage process.

Methods of Evaluation

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The used frequency is 1 Hz. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multi-stage polymerization is measured with a Zetasizer Nano S90 from MALVERN.

The particle size of the polymer powder is measured with Malvern Mastersizer 3000 from MALVERN.

For the estimation of weight average powder particle size, particle size distribution and ratio of fine particles a Malvern Mastersizer 3000 apparatus with a 300 mm lenses, measuring a range from 0.5-880 μm is used.

D (v, 0.5) or more short D50 is the particle size at which 50% of the sample has size less then and 50% of the sample have a size larger then that size, or in other words the equivalent volume diameter at 50% cumulative volume. This size is also known as volume median diameter that is related to the mass median diameter by the density of the particles assuming a size independent density for the particles.

D (v, 0.1) or D10 is the particle size at which 10% of the sample is smaller then that size, or in other words the equivalent volume diameter at 10% cumulative volume.

D (v, 0.9) or D90 is the particle size at which 90% of the sample are smaller then that size.

Examples

Abbreviations
MMA—methyl methacrylate
BA—butyl acrylate
EA—ethyl acrylate

The comparative examples 1 and 2 are made according to the synthesis described in WO2008/104701.

Comparative example 1: Charged into a reactor, with stirring, were 8500 g of water, 5.23 g of $Na_2O_3$ and 78.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4157.2 g of methyl methacrylate, 260.95 g of styrene and 782.85 g of n-butyl acrylate was nitrogen-degassed for 30 minutes. Next, the mixture was rapidly introduced into the reactor using a pump. When the temperature of the reaction mixture reached 55 degrees centigrade, 7.8 g of potassium persulfate dissolved in 148 g of water were introduced. The line was rinsed with 50 g of water. The reaction mixture was left to rise in temperature to the exothermal peak. The polymerization was then left to completion for 60 minutes after the exothermal peak. The reactor was cooled down to 30° C. The polymer was then recovered, the latex being dried by spray drying.

Comparative example 2: Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4427 g of methyl methacrylate and 781 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Comparative example 3: Charged into a reactor, with stirring, were 8600 g of water, 5.23 g of Na$_2$CO$_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4259.58 g of methyl methacrylate, 156.57 g of n-butyl acrylate and 782.85 g of ethyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Example 1: Particles with final stage forming outer layer based on EA. A sufficient quantity of latex was prepared according to comparative example 1, but not spray dried. The starting material is the latex composition as described in comparative example 1. The last step is polymerized in a 20 liters reactor. The reactor has been charged with 12000 g of latex with a solid content is 38%. Three vacuum-nitrogen purges were carried out in succession and the reactor left under a slight vacuum. The reactor was then heated at 80° C. At the same time, a mixture comprising 240 g of ethyl acrylate and 1.32 g of n octyl mercaptan was nitrogen-degassed for 30 minutes. Next, the mixture was rapidly introduced into the reactor using a pump. The line was rinsed with 100 g of water. When the temperature of the reaction mixture reached 80° C., 0.72 g of potassium persulfate dissolved in 50 g of water were introduced. The line was rinsed with 50 g of water. The reaction mixture was left to rise in temperature to a small exothermal peak. The polymerization was then left to completion for 60 minutes. Then 0.24 g of potassium persulfate dissolved in 50 g of water were introduced. The line was rinsed with 50 g of water. A holding period of 30 min was waited. The reactor was cooled down to 30° C. The polymer was then recovered, the latex being dried by spray drying. The results of the particle size distributions obtained are given in the table 1.

Example 2 and 3 were made accordingly to example 1, while changing the latex starting material respectively to comparative example 2 and 3.

The dried powders of all examples and comparative examples are analysed with Malvern Mastersizer 3000 to measure the particle size distribution and estimate the D10, D50 and D90 values respectively. Results are summarized in table 1.

TABLE 1

| Examples | Composition polymer (B1) in wt % | | | | Composition polymer (A1) in wt % | | | Tg (° C.) of (B1) Tg before last step | PSD [μm] | | |
|---|---|---|---|---|---|---|---|---|---|---|---|
| | MMA | Styrene | BA | EA | EA | BA | MMA | | D10 | D50 | D90 |
| Ex 1 | 80 | 5 | | 15 | 100 | | | 105 | 13 | 38 | 95 |
| Comp. Ex 1 | 80 | 5 | | 15 | | | | 105 | 6 | 19 | 45 |
| Ex. 2 | 85 | | | 15 | 100 | | | 102 | 10 | 26 | 56 |
| Comp. Ex 2 | 85 | | | 15 | | | | 102 | 5 | 14 | 40 |
| Ex. 3 | 82 | | 3 | 15 | 100 | | | 103 | 12 | 30 | 66 |
| Comp. Ex. 3 | 82 | | 3 | 15 | | | | 103 | 6 | 15 | 35 |

The comparative examples 1, 2 and 3 have a much smaller D10 value than the examples 1 to 3, which indicates a larger population of smaller particles or a larger fine content.

The invention claimed is:

1. A polymer composition in the form of polymeric particles having a multilayer structure, said polymeric particles comprising:
   at least one stage forming a layer (B) comprising polymer (B1) which is a (meth)acrylic polymer having a glass transition temperature between 80° C. and 150° C. and
   at least one stage forming an external layer (A) of the multilayer structure, said external layer (A) comprising polymer (A1) having a glass transition temperature between −50° C. and 50° C. and wherein the polymer (A1) comprises at least 50 wt % of polymeric units coming from ethyl acrylate monomer,
   said polymeric particles obtained by a multistage process, wherein the weight ratio r in wt % of the external layer (A) comprising polymer (A1) in the polymer particles, for a Tg between 200K and 333K of polymer (A), is defined by the following formula $$r = b_1 e^{a_1 T}$$

wherein the variable T is the glass transition temperature Tg expressed in Kelvin of the polymer (A1) of the external layer (A), exponent $a_1$ is at least 0.0255 and at most 0.028 and factor $b_1$ is at least 0.0055 and at most 0.007,
   and wherein the mass average molecular weight Mw of the polymer (A1) is less than 500,000 g/mol.

2. The polymer composition according to claim 1 wherein the polymer (A1) is an acrylic copolymer further comprising monomers coming from acrylic or methacrylic monomers, other than ethyl acrylate monomer.

3. The polymer composition according to claim 2 wherein the acrylic or methacrylic monomers of the polymer (A1) are chosen from the group consisting of methyl acrylate, propyl acrylate, isopropyl acrylate, butyl acrylate, tert-butyl acrylate, methyl methacrylate, ethyl methacrylate, butyl methacrylate and mixtures thereof.

4. The polymer composition according to claim 1, wherein the polymer (B1) comprises at least 70 wt % monomers chosen from the group consisting of C1 to C12 alkyl (meth)acrylates.

5. The polymer composition according to claim 1 wherein the polymer (B1) comprises acrylic or methacrylic monomers that are chosen from the group consisting of methyl acrylate, ethyl acrylate, butyl acrylate, methyl methacrylate, ethyl methacrylate, butyl methacrylate and mixtures thereof.

6. The polymer composition according to claim 1 wherein the mass average molecular weight of the polymer (B1) is at least 300,000 g/mol.

* * * * *